United States Patent [19]

Dombrowski et al.

[11] 4,347,769

[45] Sep. 7, 1982

[54] UNDERFLOOR LATHE FOR PROFILING WHEEL SETS

[75] Inventors: Theodor Dombrowski; Max Luzina, both of Erkelenz, Fed. Rep. of Germany

[73] Assignee: Wilhelm Hegenscheidt Gesellschaft mbH

[21] Appl. No.: 180,817

[22] Filed: Aug. 25, 1980

[30] Foreign Application Priority Data

Sep. 19, 1979 [DE] Fed. Rep. of Germany ....... 2937751

[51] Int. Cl.³ .............................................. B23B 5/32
[52] U.S. Cl. .......................................... 82/8; 82/4 E
[58] Field of Search ..................................... 82/8, 4 E

[56] References Cited

U.S. PATENT DOCUMENTS 3,345,891 10/1967 Dombrowski ............................. 82/8
3,667,329 6/1972 Dombrowski ............................. 82/8

FOREIGN PATENT DOCUMENTS 1204496 11/1965 Fed. Rep. of Germany ............ 82/8

Primary Examiner—Leonidas Vlachos
Attorney, Agent, or Firm—Arthur B. Colvin

[57] ABSTRACT

This invention relates to an underfloor wheel set lathe for the profiling of wheel sets of trackbound vehicles of the type in which the wheels are at least in part supposed by rolls carried by a roll carrier, at least one of the rolls being driven. Movement of the roll carrier is resisted by a horizontally acting brake mechanism which permits vertical lifting movements of the carrier. The force with which horizontal movement is resisted may, by suitable hydraulic means, be controlled as a function of the cutting force or driving force imparted to the wheels, the lifting force exerted against the wheels, or otherwise coordinated with the force applied in the course of profiling.

7 Claims, 6 Drawing Figures

UNDERFLOOR LATHE FOR PROFILING WHEEL SETS

This invention relates to an underfloor wheel set lathe for the profiling of wheel sets of trackbound vehicles, utilizing rolls which can be caused to contact at least the treads of the wheels of the wheel set, are movable horizontally and vertically, are mounted in roll carriers, and at least one of which per tread can be driven. The rolls can be caused to contact the treads of the wheels at least partly to support the weight of the wheel set.

THE PRIOR ART

A lathe of the above mentioned kind is already known from German Pat. No. 20 21 820. The noted patent discloses a device in which the wheels of the wheel set are centered during the machining operation by rigid flange support rolls engaging the wheel flanges with a part load kept as small as possible while the main load component is absorbed by rolls which rest against the treads and are movable both horizontally and vertically. The tread rolls are drivable and drive the wheel set by friction. Accordingly, a small part of the weight pressure exerted by the wheel set is absorbed by the flange support rolls and the major part by the movable, drivable tread rolls. Due to the fact that power is transmitted to the wheels by friction, the bearing pressures of the tread rolls are power-determining. But these bearing pressures are limited by the wheel set weight.

The pressure distribution between flange support rolls and tread rolls must be selected so that, on the one hand, the reactive forces from the cutting forces exerted by the cutting tool edge cannot roll the wheel set out of the V-like seat provided by the flange support rolls and out of the lathe via these rolls (the drive rolls would offer no resistance to this motion). On the other hand, the roll carrier with the drive rolls must be guided in its position by the wheel of the wheel set and must not revolve around the wheel, e.g. due to the reactive forces of excessive cutting forces at the cutting tool. This restricts the cutting power of such lathes. It is only in the area of flange machining that the efficiency of such a lathe improves because the roll carrier for the tread rolls can be immobilized since there are no inaccuracies in the freshly profiled tread and the roll carrier. Thus, the tread rolls can remain in contact with the tread and can consequently be loaded with the entire wheel set load available, as the flanges are turned off under the rigid flange support rolls.

One alternative having become known for the partial support by flange support rolls is the partial support at the journal boxes of the wheel set. The flange support rolls can then be omitted, but the problems remain the same.

Although the capacity of this machine is limited, this capacity is considerably better with respect to both cutting power and accuracy then, for instance, the forerunner of this machine which has become known from British Pat. No. 994,470. In the said forerunner, the rolls are accommodated in pairs in a common roll carriage, the carriage being guided vertically in guideways formed on the machine frame. The rolls have no horizontal mobility. But guideways introduce friction. The friction forces in the guideways are amplified considerably by the far overhanging rolls.

The vertical motion of the roll carriage needed for the machining operation is hindered by this friction. This causes quite considerable additional forces to act upon the wheel set axle, bending it. Since the turning tool retains its cutting position in such machines while the axis of rotation is displaced due to the deflection, intolerable inaccuracies occur in the course of reprofiling.

In order to be able to employ such a lathe while minimizing inaccuracies, cutting has been effected by removing smaller and smaller chips in several passes, in order to improve the accuracy from pass to pass on the one hand, and to reduce the machine stress and, hence, also the friction forces in the guideways on the other.

With this procedure success is also achieved in obtaining acceptable results with a lathe according to British Pat. No. 994,470.

The frictionless mobility of the rolls of a machine according to German Pat. No. 20 21 820 permits a much greater cutting capacity with equal accuracy. No friction forces occur in guideways which could deflect the wheel set axle additionally. The distance between axis of rotation and cutting tool always remains constant.

SUMMARY OF THE INVENTION

It is an object of the invention to provide an underfloor or pit mounted wheel lathe of the kind described at the outset which makes possible a further increase in cutting power without having to relinquish the advantages of the movable drive rolls.

According to the invention, this problem is solved by providing that each roll carrier for the rolls which can be caused to contact the treads is in positive connection with a brake acting in horizontal direction. Through this measure, a roll carrier under the reactive influence of the cutting force is prevented from shifting by the brake. But since the braking forces can be limited, the necessary mobility of the rolls required for accommodation of possible eccentricities and shape irregularities of the tread of the respective wheel is retained nevertheless. Additional vertical forces which can deflect the wheel set axle in vertical direction do not occur. But under certain conditions horizontally directed forces can act upon the wheel set and can deflect the wheel set axle in horizontal direction. However, a deflection of the wheel set axle in horizontal direction has no adverse effects on the accuracy of the diameter and the concentricity of the wheel set.

According to one embodiment of the invention, it is suggested that the rolls which can be caused to contact the treads and are mounted in roll carriers be drivable singly in a manner known per se.

In another embodiment it is suggested that, in a manner known per se, two rolls mounted in a roll carrier common to both can be caused to contact each tread, each roll carrier being in positive connection with a brake acting in horizontal direction, and both rolls being drivable either jointly or individually. What this measure achieves is that the spreading forces, stemming from the wheel set weight and acting upon the rolls, are short-circuited in the roll carrier and need not be absorbed by extraneous forces. This simplifies the design of the brake required. Driving both rolls jointly simplifies the design of the drive system, but necessitates exactly identical roll diameters of both rolls. Driving such rolls individually permits an individual power and speed control of the rolls.

According to another embodiment of the invention it is also possible to mount each one of the rolls which can be caused to contact the tread in a separate roll carrier, each roll carrier being in positive connection with a brake. This makes it possible to minimize the mass of the movable roll carriers. This reduces the effect of acceleration forces on the wheel set.

It is proposed in accordance with a further embodiment that each brake consist essentially of two horizontally movable brake segments, the one brake segment resting against the roll carrier and the other brake segment against the moving part of a fluid-actuated piston-cylinder unit which effects the motion of the brake segments and is supported by the machine frame or the foundation. The brake segments support each other by wedge surfaces having an angle of inclination greater than the self-locking angle and are enclosed, at least in part, by retaining means guiding the brake segments and absorbing the spreading and braking force. Such a brake design assures good functioning and easy controllability or adjustability of the brake.

It is proposed further that the brakes in positive connection with the roll carriers be movable into a center position and lockable there. What this achieves is that, while seating the wheel set, the rolls assume a central position, thus aligning the wheel set while being seated. Such an aligning operation has already been described in British Pat. No. 994,470 (FIGS. 1 to 6). After the wheel set is seated and partly supported, the lifting force of the rolls is reduced and the blockage of the brakes released.

In further development of the invention it is proposed that the sum of the torques acting upon the rolls of the respective roll carrier be used as reference magnitude for the braking force adjustment. The said torque is a reliable measure of the respectively required cutting power, and thus of the respectively required minimum braking force, and it is readily measurable.

It is proposed in further development that half the possible maximum of the total drive torque be used as reference magnitude for the braking force adjustment. Due to this measure, a control of the braking force can be omitted in favor of a simple braking force adjustment while retaining the advantages of a movable roll carrier.

In another embodiment of the invention it is proposed that the momentary longitudinal feed force of the coordinated turning tool be used as reference magnitude for the brake force adjustment. The longitudinal feed force is a function of the main cutting force and is easily determined through the feed drive. But it is essentially the main cutting force which must be supported by the brakes. By taking the longitudinal feed force as reference magnitude it is therefore possible in a particularly simple manner to control the braking force precisely.

Another embodiment of the invention provides that the momentary main cutting force of the coordinated turning tool be used as reference magnitude for the braking force adjustment of the brakes. Referencing the brake force to the main cutting force is an alternative to referencing to the longitudinal feed force.

It is suggested in further development to use as reference magnitude for the braking force adjustment of the brakes the lifting force of the lifting cylinders which cause the tread rolls to contact the wheel tread. The power transmission ability of the tread rolls is limited by the lifting force. Accordingly, the maximum braking force required is known also. Now the brake can be adjusted to a constant braking force as a function of this maximum. Varying bearing pressures which are needed for different types of wheel sets are thus automatically taken into account in the braking force. Too great a braking force when full power capacity is not required of the machine does not adversely affect the accuracy and function of the machine because the roll carrier remains movable now as before, and because the required roll carrier shifting force stemming from the residual braking force will possibly deflect the wheel set axle in the horizontal plane so that effects on the diameter and/or accuracy of the wheel are not to be expected.

The invention will now be explained in greater detail with reference to the drawings in which.

Figure 1:
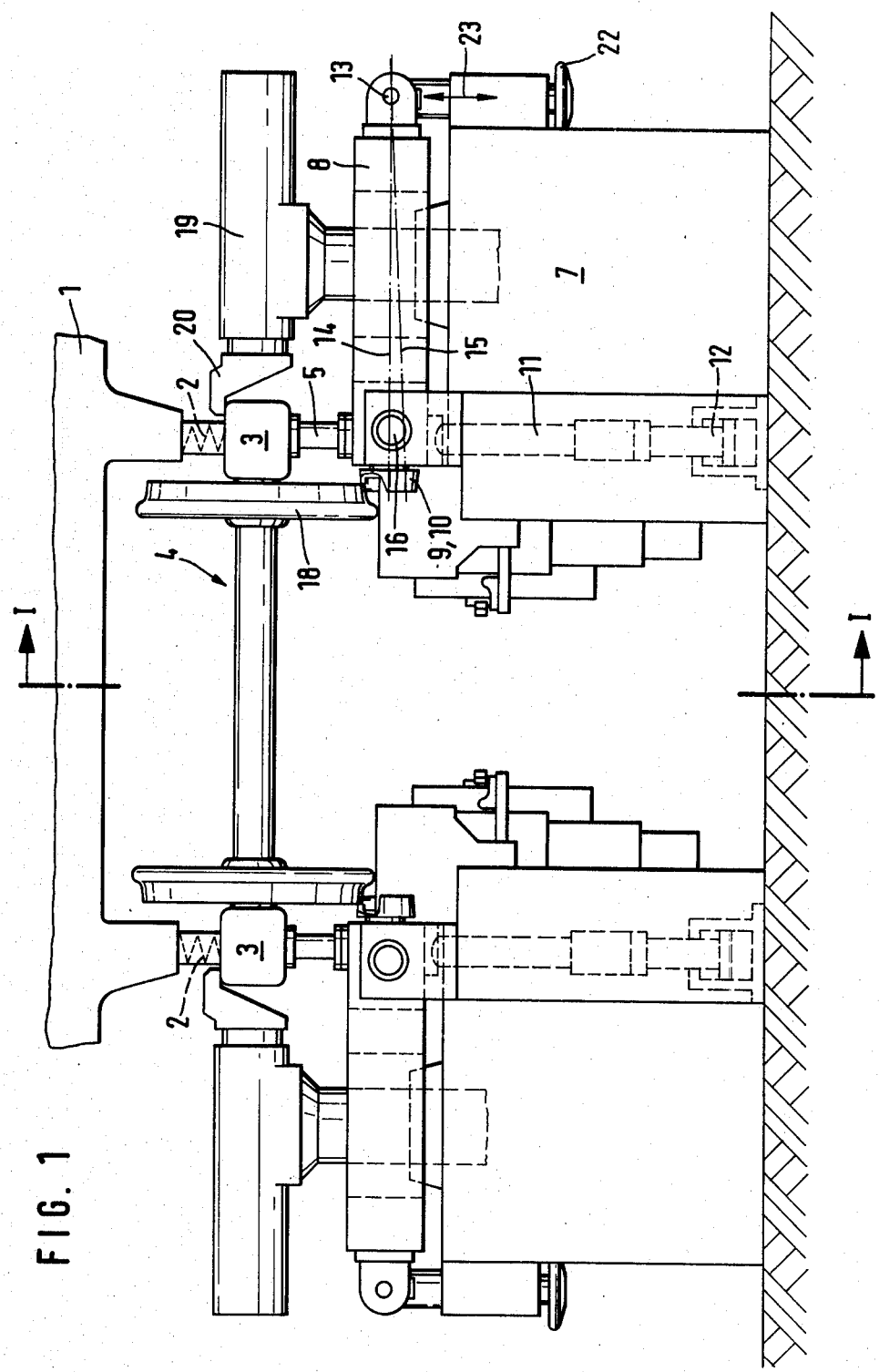
FIG. 1 shows the front view of an entire underfloor wheel set lathe.

Referring now to the drawings, a truck 1 of a railroad car (not shown) is supported via springs 2 by the journal boxes 3 of a wheel set 4. Each journal box 3 is supported by supporting means 5 which, in turn, are supported by a bracket 6 (FIG. 4) joined to the machine frame 7. The underfloor wheel set lathe has two symmetrical sides from the sectional plane I—I, for which reason the description of the machine and its function is limited to one half.

For the wheel set to get into the seated position just described it may have been rolled into the lathe first in a manner known per se, e.g. as shown in British Pat. No. 994,470, FIG. 1.

A roll carrier 8 carrying two rolls 9 and 10 is supported at its outer end by a ball joint 13, and at its inner end, near the rolls 9 and 10, by a lifting cylinder 12 via a roll carrier support 11. While the wheel set is running in, the lifting cylinder 12 is lowered so that the axis of rotation shown by a line 14 assumes the inclined position of a line 15. The upper edge of the rolls 9 and 10 is then below the upper edge of the rail.

Subsequently, the roll carrier 8 is raised by the lifting cylinder 12 via the roll carrier support 11, with the brakes 16, 17 locked, which thereby center the roll carrier 8. The rolls 9 and 10 make contact with the tread of the wheels 18 of the wheel set 4, in the process lifting the wheels 18 off the rails. It is in this position that the supporting means 5 can be put in place and the roll carrier 8 lowered again until the journal box 3 rests on the supporting means 5. The lifting force of the lifting cylinder 12 is now adjusted by regulating the fluid pressure that the lifting cylinder transmits about 80 to 90% of the force required to lift the wheel 18. The remainder of the force is then absorbed by the supporting means 5. The brakes are now released, and the turning operation can proceed in known manner.

An escape of the roll carrier under the reactive force of the cutting force is no longer possible because it is completely absorbed by the brake arrangement. On the other hand, shape irregularities of the tread exert an additional force on the roll carrier 8 which exceeds the force of the brake arrangement, so that the roll carrier 8 can escape when acted upon by shape irregularities.

This does not cause an alternating stress on the wheel set axle in vertical direction.

If the output of the machine is to be increased further, a holddown assembly 19, such as known from German Pat. No. 20 36 093 may be used, whose holddown claw 20 is applied to the top surface of the journal box 3. The lifting force of the lifting cylinder 12 and, hence, the bearing pressure of the rolls 9 and 10 can now be increased further without the journal box 3 lifting off the supporting means 5. The wheel set 4 remains centered in its axle bearings.

Figure 2:
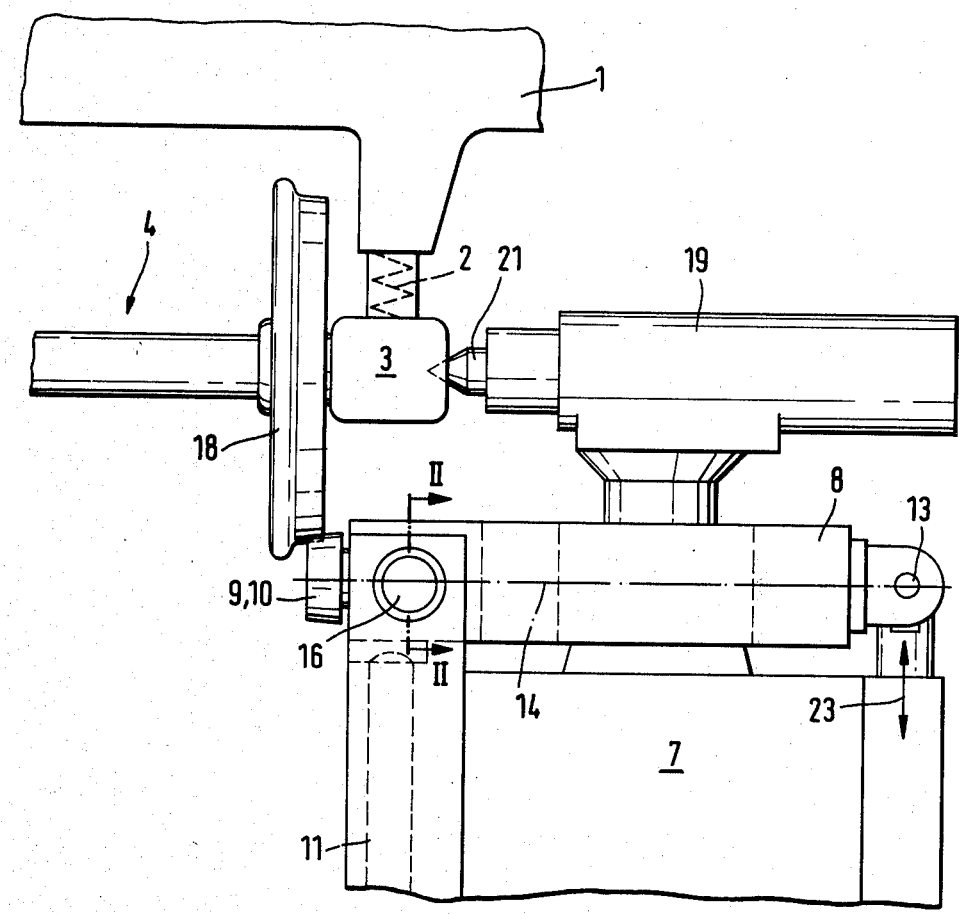
FIG. 2 is a partial view of an underfloor wheel set lathe.

As FIG. 2 shows, a dead center 21 can naturally also be used instead of the holddown claw 20. To be able to adapt the roll carrier 8 heightwise to different diameters of wheels 18 of different sheel sets 4, the ball joint 13 and, hence, the entire roll carrier 8 is height-adjustable in the direction of the arrows 23 by a handwheel.

Figure 3:
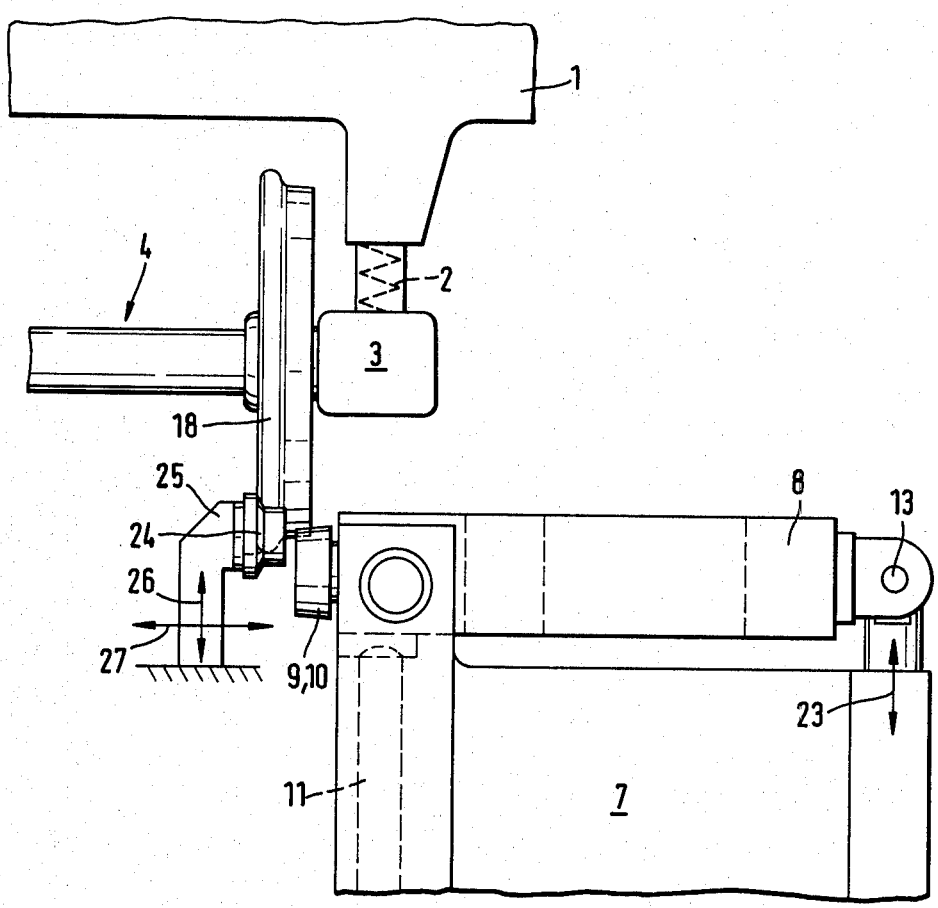
FIG. 3 is a partial view of an underfloor wheel set lathe with rigid flange support rolls.

As FIG. 3 shows, instead of the seating of the wheel set on the journal boxes as before, it can naturally also be seated through flange support rolls 24 which are fastened to a carrier 25. Such a seating through flange support rolls has already been disclosed in German Pat. No. 20 21 820. So that the wheel set can roll into the lathe unimpeded, the flange roll 24 must be movable in the direction of the arrows 26 or arrows 27, for example.

According to FIG. 3, the two flange support rolls 24 required per wheel absorb the load component carried by the supporting means 5 according to FIG. 1, if no holddown device 19 is used. Since the flange of the wheels 18 is usually undamaged, the wheel set is guided precisely centered by the flange support rolls 24. The main load of the wheel set is again absorbed by the rolls 9, 10 through the bearing pressure required. Here too the roll carrier 8 is movable, with breaking in the manner already described. The reactive forces originating from the motion of the roller carrier 8 are absorbed by the flange support rolls 24.

Figure 3A:
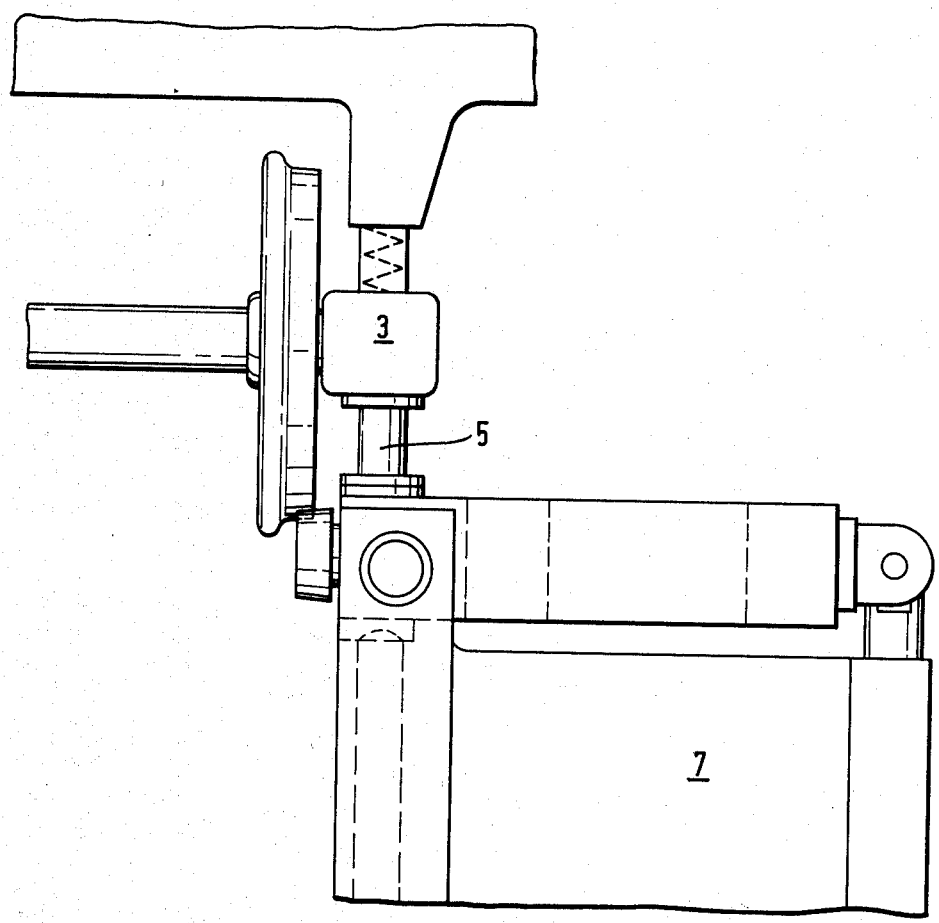
FIG. 3a is a partial view like FIG. 3, except with supported journal box and without flange support roll.

As may be seen from FIG. 3a, the run-in wheel set may also be seated and supported very simply on the supporting means 5 by the journal boxes 3. Basically, no other supporting measures are needed to perform a reprofiling operation. This makes the operation of the lathe particularly simple. This simple supporting mode is possible without problems whenever the vehicle belonging to the wheel set to be reprofiled carries very heavy loads per axle, such as a locomotive. Because of the high axle loads, relatively high bearing pressures of the rolls 9, 10 can be worked with, and yet a sufficiently large residual force remains for support by the supporting means 5. This residual force at the supporting means 5 is required because the reactive forces from the motion of the roll carrier 8, to the extent that they are not neutralized by the cutting force and associated magnitude of the braking force, must be absorbed in horizontal direction by the friction force between journal box 3 and supporting means 5. While these residual forces are small, they are present nevertheless.

Figure 4:
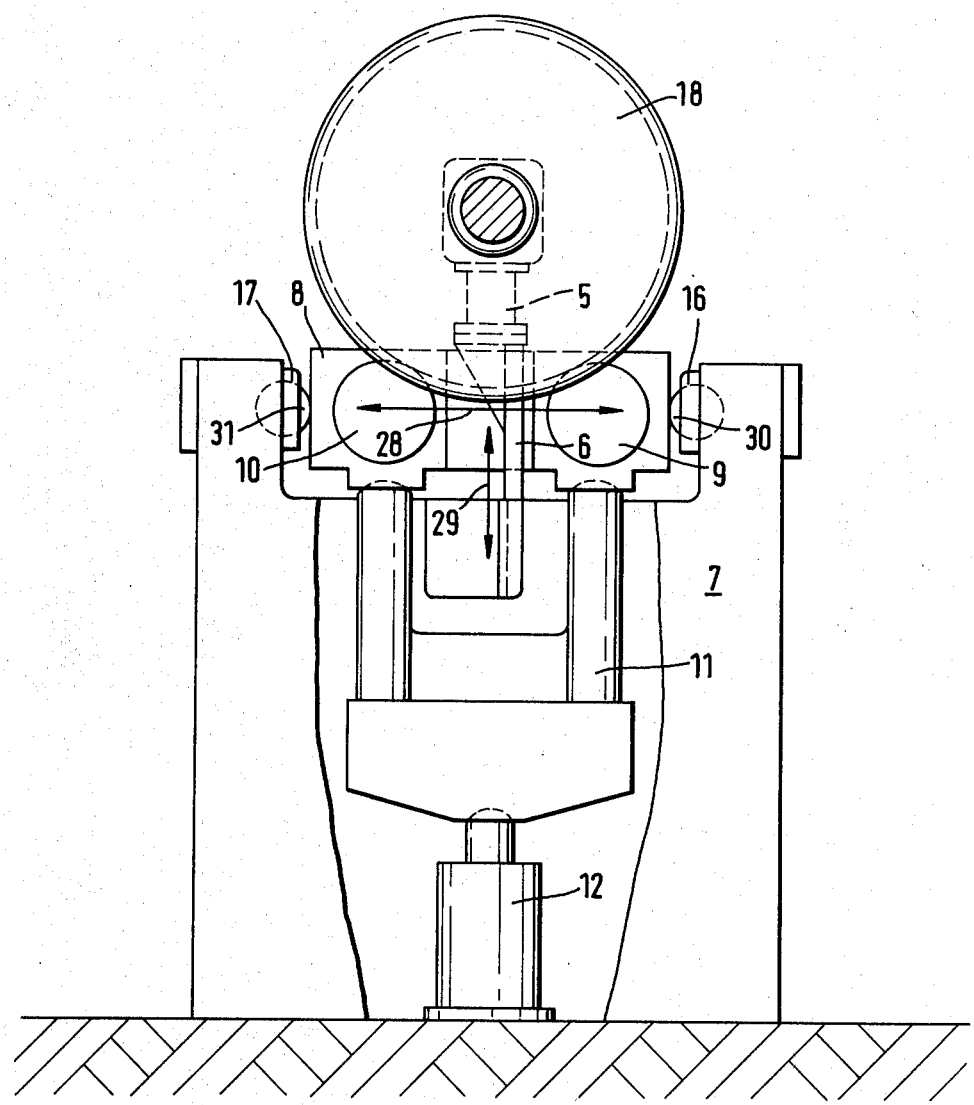
FIG. 4 is a sectional view taken on the line I—I of FIG. 1.

FIG. 4 shows a roll carrier 8 in center position to seat and center the wheel 18 of the wheel set 4, a position attained due to the locking of the brakes 16 and 17. The brakes 16 and 17 are always in contact with the roll carrier 8 via guide rolls 30, 31, thus assuring that, in the event of vertical motion, i.e. in the direction of the arrows 29, the roll carrier 8 is guided virtually without friction (i.e. by rolling friction) and, in the event of horizontal motion, i.e. motion in the direction of arrow 28, it is supported by the brakes 16 and 17, respectively.

Figure 5:
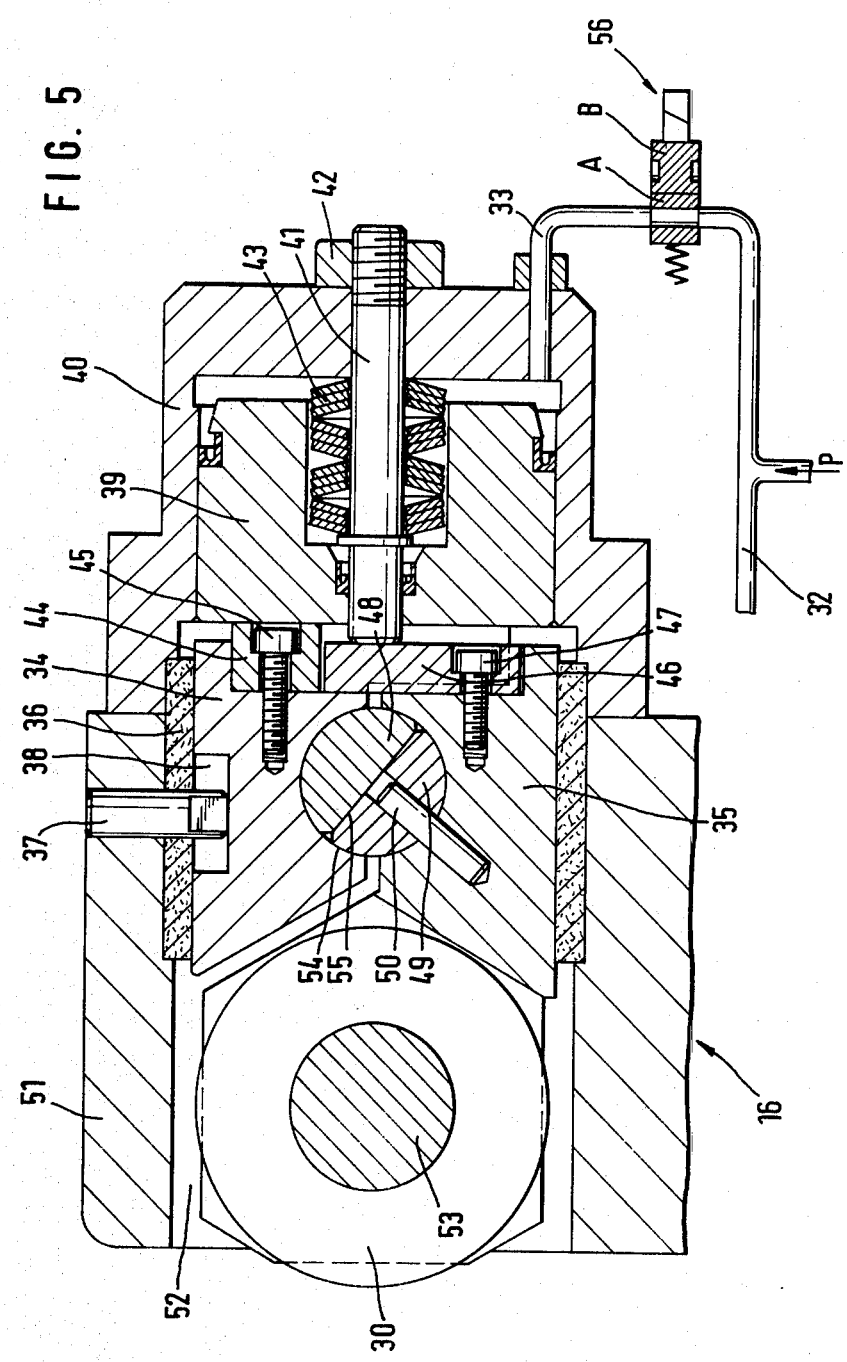
FIG. 5 is a longitudinal section on the line II—II of FIG. 2 of a braking device.

An example of the construction and function of such a brake is shown in FIG. 5. A housing 51 has a cylindrical, longitudinal bore 52, equipped at one end with a brake lining 36. Two brake segments 34 and 35, disposed inside the brake lining 36, interact with the brake lining 36 to achieve the desired braking action.

The brake segment 35 supports at its front end the guide roll 30 which, in operation, contacts the roll carrier 8 (not shown in FIG. 5). At its rear end, the brake segment 35 has a driver 46 joined to it by screws 47. In the initial position, this driver 46 also rests against the plane surface of a recess at the rear end of the brake segment 34, in which a forkshaped pusher 44 is disposed, the pusher being screwed to the brake segment 34 by screws 45.

The forkshaped pusher 44 engages the driver 46 but does not rest against the rear end of the brake segment 35.

Both brake segments 34 and 35 have portions of a cylindrical hole 54 common to each, the centerline of the hole 54 running parallel to the axis of the guide roll 30. In the hole 54 are disposed the two halves of a longitudinally split cylinder 48, 49. A parting plane 55 between the cylinder halves 48, 49 has an angle of inclination to the direction of brake segment motion greater than the self-locking angle. A pin 50 secures the angular position of half 49.

The entire system is secured against rotation by a key 37 and keyway 38.

At its rear end, the housing 51 has a fluid cylinder 40 in which a piston 39 is disposed. The piston 39 is in contact with the forkshaped pusher 44 of the brake segment 34. The fluid cylinder 40 is acted upon by the fluid pressure P through a line 33. One end 32 of line 33 is connected directly to the fluid of brake 17. Consequently, the fluid cylinders of both brakes 17 and 16 are acted upon by the same fluid pressure P.

Driven by the fluid, the piston 39 will move the brake segment 34 via the forkshaped pusher 44. But thereby the brake segment 34 will also move the brake segment 35 via the slider 48, the parting plane 55 and the slider 49. The same occurs at the brake 17, whereby the guide rolls 30 and 31 are pushed against the roller carrier 8 with a force depending on the fluid pressure P. But this causes the sliders 48 and 49 to slide over each other along their parting plane 55, and a radial spreading motion of the brake segments 34 and 35 results, whereby they are pushed against the brake lining 36, generating a braking action. Now, if the roll carrier 8 is to move in the direction of the arrows 28, the braking force must be overcome first. If the cutting force at the turning tool is as great as the braking force of both brakes, this neutralizes the braking force so that the least additional force can deflect the roll carrier. What is important, however, is that the cutting force is supported in any case, yet the roll carrier remains mobile where extraordinary forces are encountered.

Penetrating the piston 39 axially is a plunger 41 which is loaded by a stack of Belleville washers 43 and therefore assumes an axial position determined by a stop nut 42.

The plunger 41 is driven by the stack of Belleville washers 43 against the driver 46 and, accordingly, moves the brake segments 35 and 34 until the stop nut 42 makes contact with the face of the fluid cylinder 40. Now the roll carrier 8 is in its centering position. So that this centering position can be retained while the wheel set is being lifted (the force of the stack of Belleveille washers 43 would be insufficient for this) pressure is admitted to the fluid cylinder 40 through the line 33. For this purpose, a valve 56 is switched into the position A. After the required pressure has built up, the valve 56 is switched into position B, which seals the fluid cylinder 40. The same happens at brake 17. Now both pistons of the brakes are fixed in position because the fluid cannot discharge from the respective fluid cylinders. Consequently, the roller carrier 8 is locked in its position and can raise and center the wheel set 4. Once the wheel set 4 is properly seated and supported in the lathe, the valve 56 is switched to position A again. The same occurs at brake 17. Now the roll carrier 8 is movable against the braking force again.

From the foregoing it will be appreciated that there is disclosed in accordance with the present invention an improved underfloor, pit mounted lathe for the profiling of wheel sets of track bound vehicles, characterized especially in that the wheels are supported by rolls carried by a roll carrier, lateral movement of which is controlled by brake mechanism active in a horizontal direction.

It will be readily recognized by those skilled in the art familiarized with the instant disclosure that variations may be made without departing from the spirit of the present invention. In particular, while a brake mechanism has been disclosed operating on mechanical friction between a movable and a fixed component, it will be understood that alternative brake types may be suitably employed.

Having thus described the invention and illustrated its use, what is claimed as new and is desired to be secured by Letters Patent is:

1. In an underfloor wheelset turning machine for the profiling of wheelsets of vehicles which run on rails roll carrier means mounted for horizontal and vertical movement, a spaced pair of rollers mounted on said carrier means, said rollers being positioned to contact at least the tread of a wheel of a wheelset disposed in said machine, and at least partially supporting the weight thereof, drive means connected to at least one said roller for driving said wheel, the improvement which comprises horizontally acting brake means operatively connected to said carrier means for yieldably resisting horizontal movement of said carrier means in a plane perpendicular to the axis of said wheel.

2. An underfloor wheel set turning machine for the profiling of wheel sets of vehicles which run on rails comprising roll carrier means mounted for horizontal and vertical movement, said roll carrier means including oppositely directed vertical guide surfaces, a spaced pair of rollers mounted on said carrier means, said rollers being positioned to contact at least the tread of a wheel set disposed in said machine, and at least partially supporting the weight thereof, drive means connected to at least one said roller for driving said wheel, and horizontally acting brake means operatively connected to said carrier means for resisting horizontal movement of said carrier means in a plane perpendicular to the axis of said wheel, said brake means comprising horizontally aligned first and second brake assemblies, each said assembly including a guide roll rotatable about a horizontal axis and engaging one of said guide surfaces.

3. A lathe in accordance with claim 2 wherein said brake assemblies include means for locking said roll carrier in a central position.

4. A lathe in accordance with claim 2 wherein said brake assemblies each comprise a first segment positioned to react against said guide roll, a second segment engaging said first segment, complemental cam surfaces formed at the junction of said segments, said surfaces being inclined to cause said segments to shift transversely responsive to movement of said second segment relative to said first segment and toward said guide roll, a housing enclosing said segments, and brake lining components interposed between said segments and said housing, said segments being urged transversely against said lining with variable force in accordance with the relatively shifted position of said segments.

5. A lathe in accordance with claim 4 and including a hydraulic cylinder and piston assembly engaging said second segments and adapted to shift the same inwardly toward said guide rolls.

6. A lathe in accordance with claim 5 and including hydraulic fluid means for lifting said roll carrier and means connecting said hydraulic fluid means to said hydraulic cylinder and piston assembly whereby the hydraulic pressure admitted to said cylinder and piston assembly and hence the braking force is a function of the force required to lift said roll carrier.

7. A lathe in accordance with claim 5 and including a turning tool, hydraulic fluid powered means for urging said tool against the tread of a wheel supported on said wheel engaging rolls, and means for powering said hydraulic and piston assembly of said brake assembly as a function of the hydraulic pressure in said hydraulic powered means for said tool.

* * * * *